(12) United States Patent
Kashiwagi

(10) Patent No.: US 10,120,625 B2
(45) Date of Patent: Nov. 6, 2018

(54) IMAGE FORMING APPARATUS THAT USES SET SHEET INFORMATION TO REDUCE USER EFFORT IN REPLENISHING SHEETS

(71) Applicant: CANON KABUSHIKI KAISHA, Tokyo (JP)

(72) Inventor: Masaki Kashiwagi, Hiratsuka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/014,447

(22) Filed: Feb. 3, 2016

(65) Prior Publication Data
US 2016/0231969 A1   Aug. 11, 2016

(30) Foreign Application Priority Data
Feb. 9, 2015 (JP) .................. 2015-023052

(51) Int. Cl.
G06F 3/12 (2006.01)
(52) U.S. Cl.
CPC .......... *G06F 3/1253* (2013.01); *G06F 3/1204* (2013.01); *G06F 3/126* (2013.01); *G06F 3/1265* (2013.01); *G06F 3/1274* (2013.01)
(58) Field of Classification Search
CPC ............................. G06F 3/1253; G06F 3/1255
See application file for complete search history.

(56) References Cited

U.S. PATENT DOCUMENTS 6,922,535 B2   7/2005 Kim
9,239,977 B2 *  1/2016 Hibi .................. G06K 15/4065
9,254,693 B2 *  2/2016 Maeda ................... B41J 11/008
2014/0293330 A1* 10/2014 Watanabe ............ G06K 15/005
                                                                 358/1.15
2015/0002862 A1 *  1/2015 Maeda ................... B41J 11/008
                                                                 358/1.2
2015/0002883 A1 *  1/2015 Hibi .................... G06K 15/4065
                                                                 358/1.14
2015/0029558 A1 *  1/2015 Koike ................ G06K 15/1894
                                                                 358/3.24

FOREIGN PATENT DOCUMENTS

JP    2004034711 A    2/2004
JP    2006184760 A    7/2006

\* cited by examiner

*Primary Examiner* — Benjamin O Dulaney
(74) *Attorney, Agent, or Firm* — Rossi, Kimms & McDowell LLP

(57) ABSTRACT

An image forming apparatus that uses set sheet information and is capable of reducing time and effort in replenishing sheets. At least one sheet feed cassette stores sheets. Sheet information of the sheet feed cassette is set according to specifications of the stored sheets using a setting screen displayed on a console panel. Print processing is performed using sheets corresponding to information on sheets included in a print job. It is determined whether or not the information on sheets corresponds to the sheet information of the sheet feed cassette. A sensor detects operations of opening and closing the sheet feed cassette. Even when an operation of opening the cassette or removal of the same has been detected, if the sheet information of the cassette corresponds to the information on sheets, the console panel does not display the setting screen.

6 Claims, 16 Drawing Sheets

FIG. 6

| SHEET FEEDER INFORMATION | CASSETTE SHEET SIZE | CASSETTE SHEET TYPE | REMAINING SHEET AMOUNT INFORMATION |
|---|---|---|---|
| SHEET FEED CASSETTE 207 | A4 | PLAIN PAPER 1 | SHEETS EXIST |
| SHEET FEED CASSETTE 208 | B4 | PLAIN PAPER 1 | SHEETS EXIST |
| SHEET FEED CASSETTE 209 | B3 | PLAIN PAPER 1 | SHEETS DO NOT EXIST |
| SHEET FEED CASSETTE 210 | A4R | PLAIN PAPER 1 | SHEETS EXIST |

FIG. 9A

| JOB NAME INFORMATION | USER NAME INFORMATION | ... | STATUS INFORMATION | DETAILED INFORMATION |
|---|---|---|---|---|
| Job1 | User1 | ... | ERROR | DETAILED INFORMATION |
| Job2 | User2 | ... | HELD IN QUEUE FOR PRINTING | DETAILED INFORMATION |
| ... | ... | ... | ... | ... |
| ... | ... | ... | ... | ... |

FIG. 9B

| FACTOR INFORMATION | FACTOR DETAILED INFORMATION A | FACTOR DETAILED INFORMATION B |
|---|---|---|
| NO SHEET TYPE | A4 PLAIN PAPER 1 | SHEET FEED CASSETTE 207 |

FIG. 13A

| HELD JOB NAME INFORMATION | USER NAME INFORMATION | STATUS INFORMATION | DETAILED STATUS INFORMATION |
|---|---|---|---|
| Job1 | User1 | MISMATCH | DETAILED STATUS INFORMATION |
| Job2 | User2 | NORMAL STATUS | DETAILED STATUS INFORMATION |
| Job3 | User3 | SHEET OUT | DETAILED STATUS INFORMATION |
| ... | ... | ... | ... |

| TO-BE-USED SHEET INFORMATION | SHEET FEEDER INFORMATION | JOB STATUS INFORMATION |
|---|---|---|
| A5 PLAIN PAPER 1 | SHEET FEED CASSETTE 207 | MISMATCH |

1306  1307  1308  1309

IMAGE FORMING APPARATUS THAT USES SET SHEET INFORMATION TO REDUCE USER EFFORT IN REPLENISHING SHEETS

BACKGROUND OF THE INVENTION

Field of the Invention

The present invention relates to an image forming apparatus, a method of controlling the same, and a storage medium, and more particularly to an image forming apparatus in which a user sets sheet information, a method of controlling the same, and a storage medium.

Description of the Related Art

An image forming apparatus including at least one sheet feed cassette, for example, a printer, performs a printing process using sheets stored in any of the at least one sheet feed cassette. In the printing process, sheets of various sizes and various types, such as thin paper, plain paper, thick paper, and OHP film, are used. The sheets are stored in the sheet feed cassettes according to the sizes and types (hereinafter referred to as "sheet information"), and items of the sheet information are set in association with the sheet feed cassettes, respectively. Particularly, in a printer which does not have a function of detecting sheet information of sheets stored in the sheet feed cassettes, when a user replenishes the sheet feed cassettes with sheets, items of the sheet information associated with the respective sheet feed cassettes are set e.g. according to user's operation on a setting screen displayed on a console panel of the printer for setting sheet information (hereinafter referred to as the "sheet information setting screen"). Here, as a technique for preventing the user from forgetting to set the sheet information, there has been known a technique for displaying, when an operation of opening and closing any sheet feed cassette has been detected, a message for prompting the user to confirm whether or not the sheet information has been set, on the console panel of the printer (see e.g. Japanese Patent Laid-Open Publication No. 2006-184760).

Incidentally, the operation of opening and closing each sheet feed cassette is performed not only when sheets are replenished but also when the remaining amount of sheets is checked or when maintenance of the apparatus is performed. In such cases as well, the sheet information setting screen is displayed according to the user's operation of opening and closing any sheet feed cassette. To cope with this inconvenience, there has been proposed a technique for displaying the sheet information setting screen only when sheets are replenished, in which whether or not to display the sheet information setting screen is determined e.g. based on a result of detection of a user's operation for opening and closing any sheet feed cassette and existence/non-existence of sheets in each sheet feed cassette (see e.g. Japanese Patent Laid-Open Publication No. 2004-034711).

However, in the conventional technique disclosed in Japanese Patent Laid-Open Publication No. 2004-034711, even when sheet feed cassettes are replenished with sheets of the same sheet information, i.e. even when there is no need to change the sheet information, the sheet information setting screen is still displayed. Therefore, the user is required to perform an operation concerning the setting of sheet information even when the sheet information need not be changed, and hence it sometimes takes unnecessary time and effort to replenish the sheet feed cassettes with sheets.

SUMMARY OF THE INVENTION

The present invention provides an image forming apparatus that uses set sheet information and is capable of reducing time and effort for replenishing sheets, a method of controlling the image forming apparatus, and a storage medium.

In a first aspect of the present invention, there is provided an image forming apparatus including at least one sheet storage unit that stores sheets, and a display unit, in which sheet information of the sheet storage unit is set according to specifications of the stored sheets using a setting screen displayed on the display unit, the image forming apparatus performing print processing using sheets corresponding to information on sheets, which is included in a print job, comprising a determination unit configured to determine whether or not the information on sheets corresponds to the sheet information of the sheet storage unit, and a detection unit configured to detect operations of opening and closing the sheet storage unit, wherein even when an operation of opening the sheet storage unit or removal of the sheet storage unit has been detected, in a case where the sheet information of the sheet storage unit of which the operation of opening or the removal has been detected corresponds to the information on sheets, the display unit does not display the setting screen.

In a second aspect of the present invention, there is provided a method of controlling an image forming apparatus including at least one sheet storage unit that stores sheets, and a display unit, in which sheet information of the sheet storage unit is set according to specifications of the stored sheets using a setting screen displayed on the display unit, the image forming apparatus performing print processing using sheets corresponding to information on sheets, which is included in a print job, the method comprising determining whether or not the information on sheets corresponds to the sheet information of the sheet storage unit, detecting operations of opening and closing the sheet storage unit, and controlling, even when an operation of opening the sheet storage unit or removal of the sheet storage unit has been detected, in a case where the sheet information of the sheet storage unit of which the operation of opening or the removal has been detected corresponds to the information on sheets, the display unit not to display the setting screen.

In a third aspect of the present invention, there is provided a non-transitory computer-readable storage medium storing a computer-executable program for executing a method of controlling an image forming apparatus including at least one sheet storage unit that stores sheets, and a display unit, in which sheet information of the sheet storage unit is set according to specifications of the stored sheets using a setting screen displayed on the display unit, the image forming apparatus performing print processing using sheets corresponding to information on sheets, which is included in a print job, wherein the method comprises determining whether or not the information on sheets corresponds to the sheet information of the sheet storage unit, detecting operations of opening and closing the sheet storage unit, and controlling, even when an operation of opening the sheet storage unit or removal of the sheet storage unit has been detected, in a case where the sheet information of the sheet storage unit of which the operation of opening or the removal has been detected corresponds to the information on sheets, the display unit not to display the setting screen.

According to the present invention, it is possible to reduce time and effort for replenishing sheets.

Further features of the present invention will become apparent from the following description of exemplary embodiments (with reference to the attached drawings).

BRIEF DESCRIPTION OF THE DRAWINGS

FIG. 6 is a view useful in explaining sheet setting information used in the image forming apparatus.

FIG. 9A is a view of job status management data used in the image forming apparatus.

FIG. 9B is a view of detailed information of a job appearing FIG. 9A.

FIG. 13A is a view of held job management data used in the variation of the image forming apparatus.

FIG. 13B is a view of detailed status information of a job appearing in FIG. 13A.

DESCRIPTION OF THE EMBODIMENTS

The present invention will now be described in detail below with reference to the accompanying drawings showing embodiments thereof.

Figure 1:
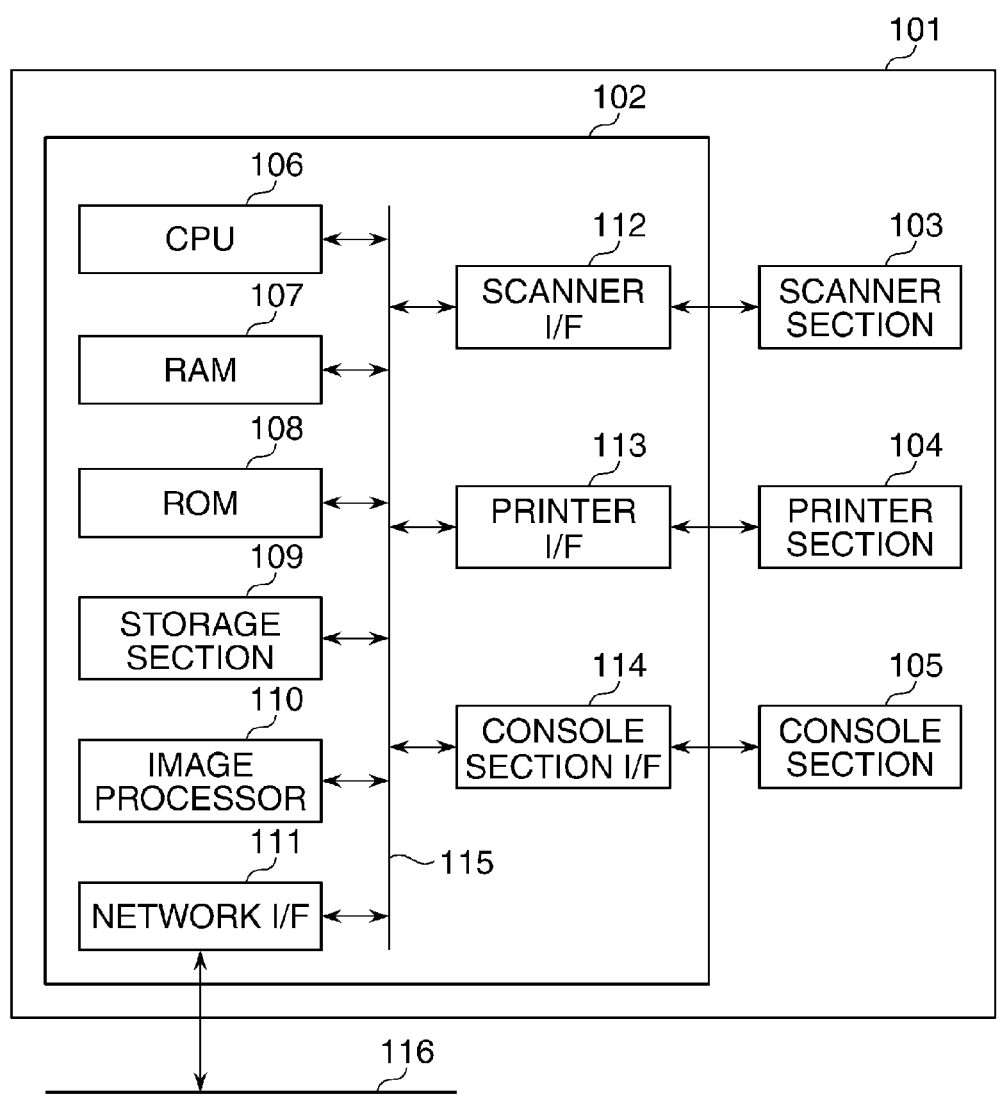
FIG. 1 is a schematic block diagram of an image forming apparatus according to an embodiment of the present invention.

FIG. 1 is a schematic block diagram of an image forming apparatus 101 according to an embodiment of the present invention.

Referring to FIG. 1, the image forming apparatus 101 is comprised of a controller 102, a scanner section 103, a printer section 104, and a console section 105. The controller 102 is comprised of a CPU 106, a RAM 107, a ROM 108, a storage section 109, an image processor 110, a network interface 111, a scanner interface 112, a printer interface 113, and a console section interface 114, as components. These components are connected to each other by a system bus 115, and the network interface 111 is connected to a LAN 116.

The controller 102 performs data communication with the scanner section 103, the printer section 104, and the console section 105, which are connected thereto, and controls these components. The scanner section 103 performs scan processing based on a control signal transmitted from the controller 102. For example, the scanner section 103 reads image information from an original placed on an original platen glass (not shown), generates image data based on the read image information, and transmits the generated image data to the controller 102. The printer section 104 performs a printing process based on a control signal transmitted from the controller 102. For example, the printer section 104 performs the printing process using any of sheets stored in sheet feed cassettes 207 to 210 (sheet storage units), described hereinafter, appearing in FIG. 2. The console section 105 includes a console panel 301 (display unit), described hereinafter with reference to FIG. 3, and setting screens for setting items of setting information of various kinds of processing are displayed on the console panel 301. The CPU 106 of the controller 102 performs centralized control of the above-mentioned components connected thereto by the system bus 115. More specifically, the CPU 106 performs various programs loaded in the RAM 107, and transmits control signals to the above-mentioned components. The ROM 108 stores a boot program for the image forming apparatus 101. The storage section 109 stores various programs, such as system software, image data, and various programs for controlling the image forming apparatus 101. The image processor 110 performs correction processing on image data transmitted from the scanner section 103 via the scanner interface 112. The network interface 111 performs data communication e.g. with an information processing apparatus (not shown) connected to the LAN 116, and receives a print job for performing the printing process from the information processing apparatus via the LAN 116. The scanner interface 112 performs data communication with the scanner section 103. The printer interface 113 performs data communication with the printer section 104. The console section interface 114 performs data communication with the console section 105.

Figure 2:
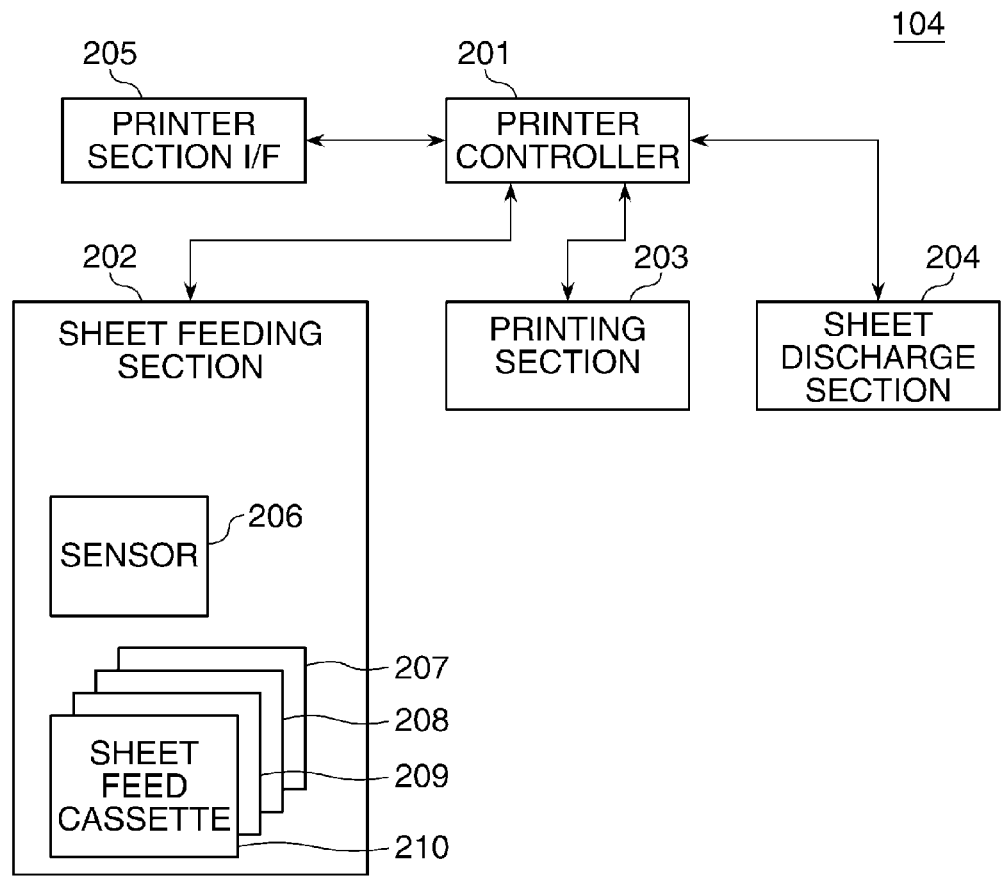
FIG. 2 is a schematic block diagram of a printer section appearing in FIG. 1.

FIG. 2 is a schematic block diagram of the printer section 104 appearing in FIG. 1.

Referring to FIG. 2, the printer section 104 is comprised of a printer controller 201, a sheet feeding section 202, a printing section 203, a sheet discharge section 204, and a printer section interface 205. The printer controller 201 is connected to the sheet feeding section 202, the printing section 203, the sheet discharge section 204, and the printer section interface 205. The sheet feeding section 202 includes a sensor 206 (detection unit) and the sheet feed cassettes 207 to 210. When the printer section interface 205 receives a control signal and image data from the controller 102, the printer controller 201 controls the sheet feeding section 202, the printing section 203, and the sheet discharge section 204, based on the control signal. The sheet feeding section 202 feeds sheets to the printing section 203 based on signals indicative of sheet feed instructions transmitted from the printer controller 201. The printing section 203 prints the image data on the sheets fed from the sheet feeding section 202 based on signals indicative of print instructions transmitted from the printer controller 201. The sheet discharge section 204 discharges printed sheets into a discharge tray (not shown). The sensor 206 detects an operation for opening or closing each of the sheet feed cassettes 207 to 210 or removal thereof, and further detects a size of sheets stored in each of the sheet feed cassettes 207 to 210. The sensor 206 transmits detection results to the controller 102 via the printer controller 201 and the printer section interface 205. The sheet feed cassettes 207 to 210 are each configured to be capable of being drawn out from the printer section 104. In the present embodiment, when any of the sheet feed cassettes 207 to 210, e.g. the sheet feed cassette 207, is drawn out from the printer section 104, the sensor 206 transmits a notification indicating that it has detected an operation of opening the sheet feed cassette 207, to the controller 102. On the other hand, when the sheet feed cassette 207, which was drawn-out, returns to its original position in the printer section 104, the sensor 206 transmits a notification indicating that it has detected an operation of closing the sheet feed cassette 207, to the controller 102.

Figure 3:
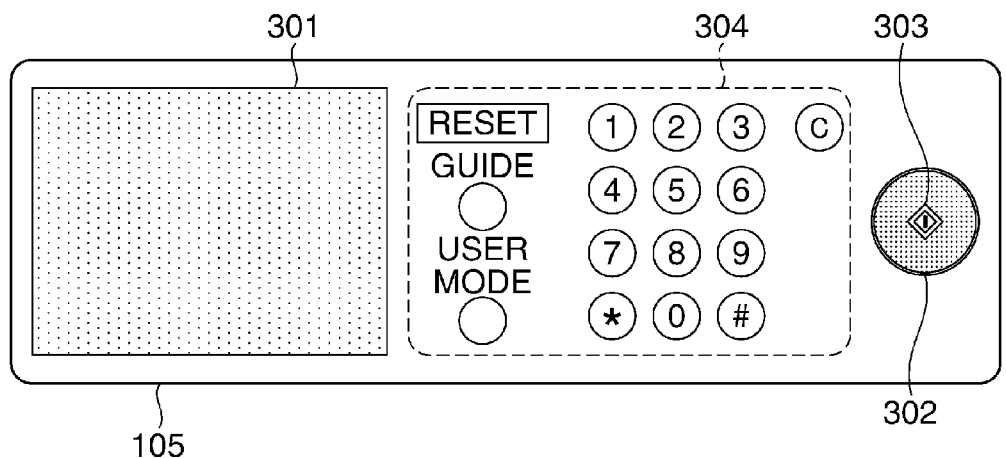
FIG. 3 is a view of the appearance of a console section appearing in FIG. 1.

FIG. 3 is a view of the appearance of the console section 105 appearing in FIG. 1.

Referring to FIG. 3, the console section 105 is comprised of the console panel 301, a start key 302, a stop key 303, and a hard key group 304. The hard key group 304 includes ten keys, a clear key, a reset key, a guide key, a user mode key, and so forth, which are used for configuring various settings.

In the console section 105, e.g. when the start key 302 is pressed, processing based on setting information set on the console panel 301 is performed. Further, when the stop key 303 is pressed, processing being executed is stopped. The console panel 301 is formed by a touch-panel type liquid crystal display. The console panel 301 displays various setting screens based on control signals transmitted from the controller 102, and the console section 105 transmits various items of setting information set by user's operations on the setting screens to the controller 102. In the present embodiment, the console panel 301 displays a sheet information management menu 400, shown in FIG. 4, with which is managed sheet information of sheets stored in the sheet feed cassettes usable in the printing process performed by the image forming apparatus 101, specifically, the sheet feed cassettes 207 to 210 appearing in FIG. 2. Further, a sheet information setting menu 500, shown in FIG. 5, in which sheet types can be set, is displayed on the console panel 301.

Figure 4:
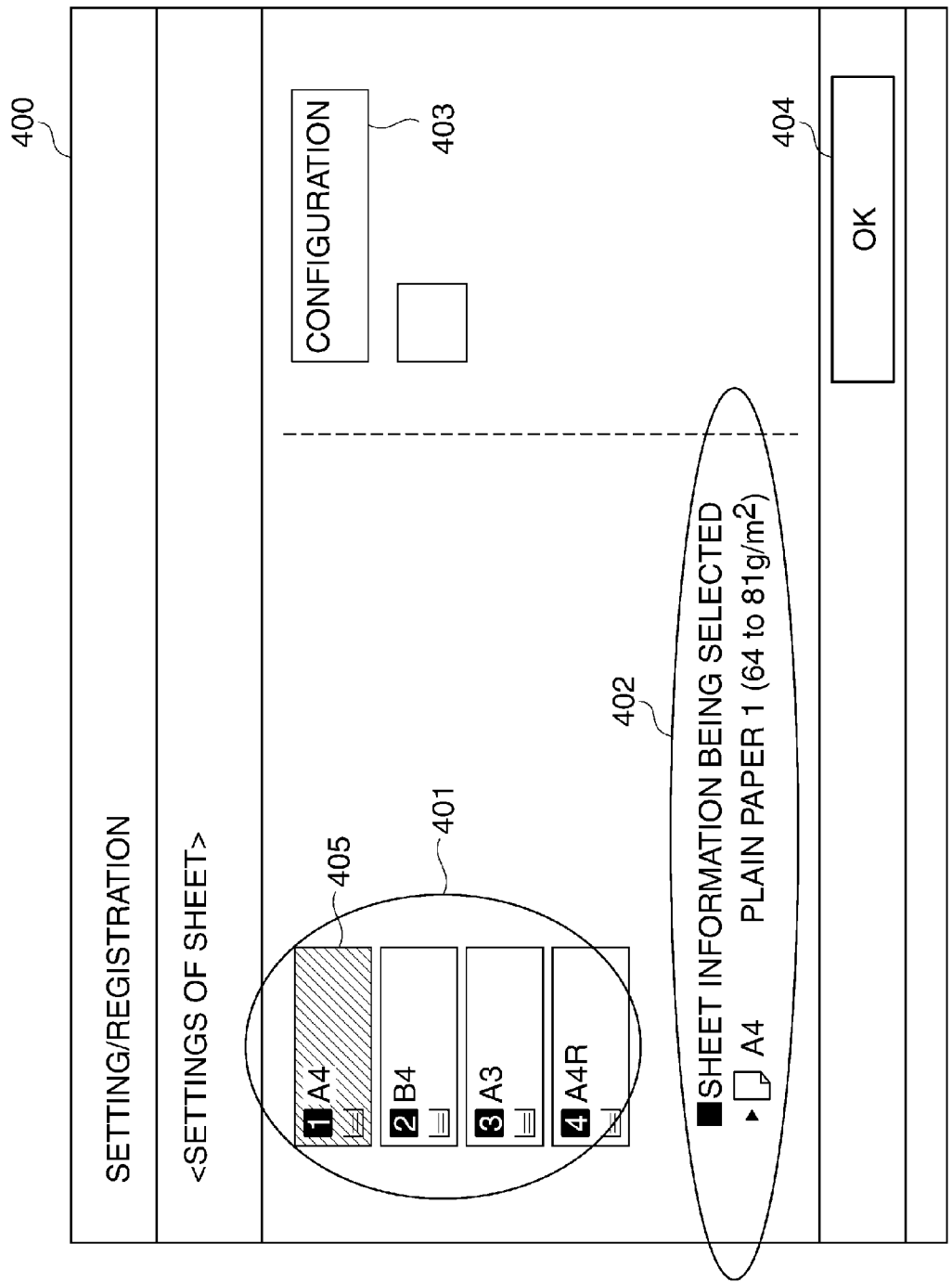
FIG. 4 is a view useful in explaining a sheet information management menu displayed on a display panel appearing in FIG. 3.
Figure 5:
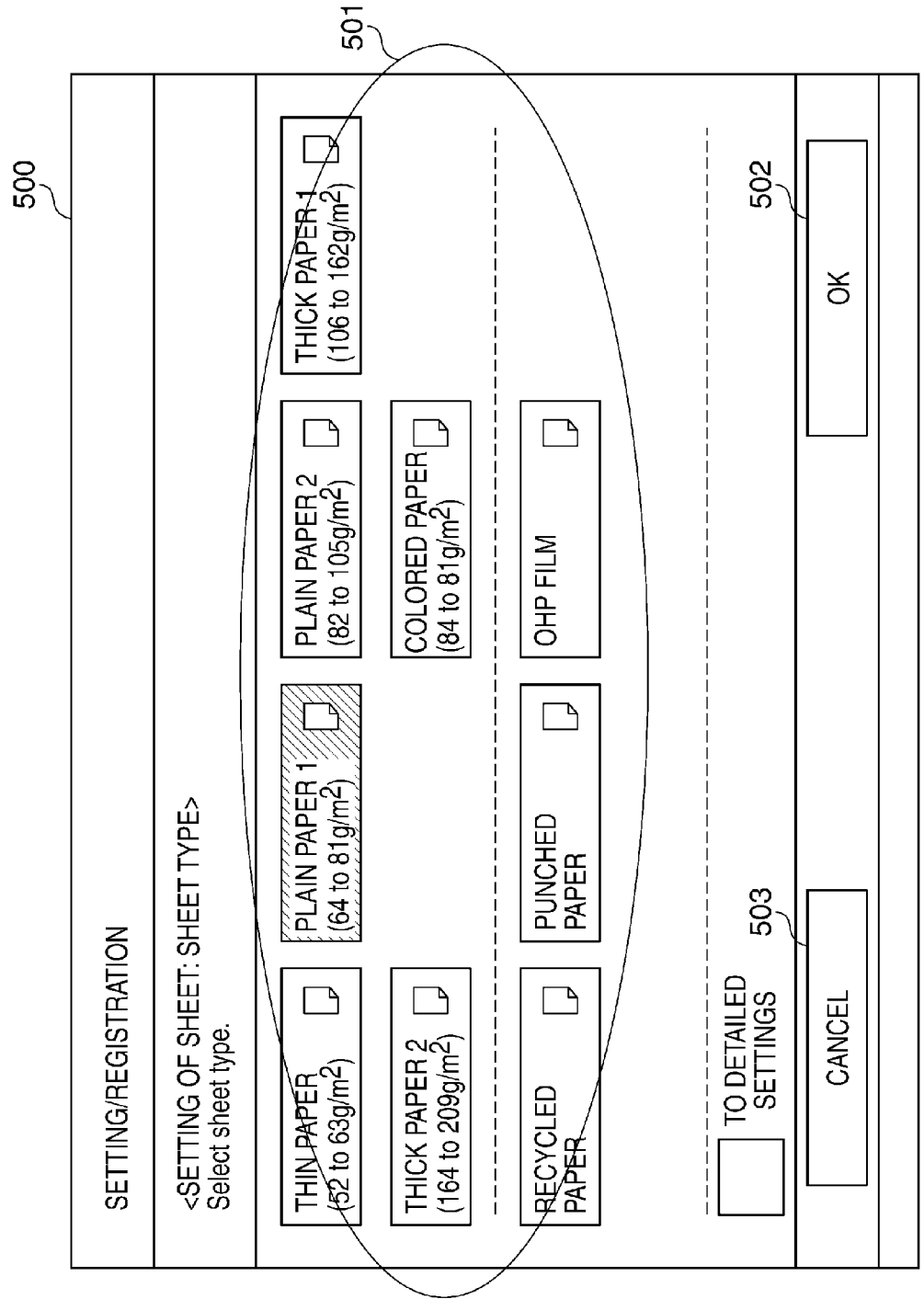
FIG. 5 is a view useful in explaining a sheet information setting menu displayed on the display panel appearing in FIG. 3.

The sheet information management menu 400, shown in FIG. 4, includes an item group 401 of items associated with the sheet feed cassettes 207 to 210, respectively, sheet information 402 corresponding to an item selected from the item group 401, i.e. an item 405, a configuration button 403 for displaying the sheet information setting menu 500, and an OK button 404 for terminating an operation on the sheet information management menu 400. In the present embodiment, the console section 105 displays the sheet information management menu 400 on the console panel 301 based on a control signal indicating a display instruction transmitted from the controller 102. For example, when the control signal is transmitted from the controller 102 to the console section 105 in response to an operation of opening the sheet feed cassette 207, detected by the sensor 206, the console section 105 displays the sheet information management menu 400 in which the item 405 associated with the sheet feed cassette 207 has been selected (a hatched portion in FIG. 4), on the console panel 301 based on the transmitted control signal, and displays the sheet information 402 of sheets stored in the sheet feed cassette 207. In a case where a sheet type of the displayed sheet information 402 is desired to be changed, assuming that a user presses the configuration button 403, the sheet information setting menu 500 shown in FIG. 5 is displayed. Note that a sheet size of the displayed sheet information 402 is set based on a result of detection by the sensor 206. That is, in the present embodiment, a sheet type of the displayed sheet information 402 is set by a user's operation of the sheet information setting menu 500, i.e. it is manually set by the user, whereas the sheet size is automatically set based on a result of detection by the sensor 206.

The sheet information setting menu 500 shown in FIG. 5 includes a sheet type item group 501 indicating the sheet types of sheets usable in the printing process performed by the image forming apparatus 101, an OK button 502 for finalizing the selection of a sheet type, and a cancel button 503 for canceling the selection of a sheet type. In the present embodiment, when any of the sheet type items of the sheet type item group 501 is selected and the OK button 502 is pressed, the selection of a sheet type is finalized, and sheet setting information 600 shown in FIG. 6 is set based on the finalized selection of the sheet type item. The set sheet setting information 600 is stored in the RAM 107. Further, in the present embodiment, when the cancel button 503 is pressed, the selection of a sheet type item is canceled, and the sheet setting information 600 shown in FIG. 6 is not set. The sheet setting information 600 is used for managing the specifications of sheets stored in each of the sheet feed cassettes 207 to 210. The sheet setting information 600 includes sheet feeder information 601 for identifying each of the sheet feed cassettes 207 to 210, a cassette sheet size 602 indicative of the size of sheets stored in each of the sheet feed cassettes 207 to 210, a cassette sheet type 603 indicative of the sheet type of sheets stored in each of the sheet feed cassettes 207 to 210, and remaining sheet amount information 604 indicating information concerning the remaining amount of sheets stored in each of the sheet feed cassettes 207 to 210.

Figure 7:
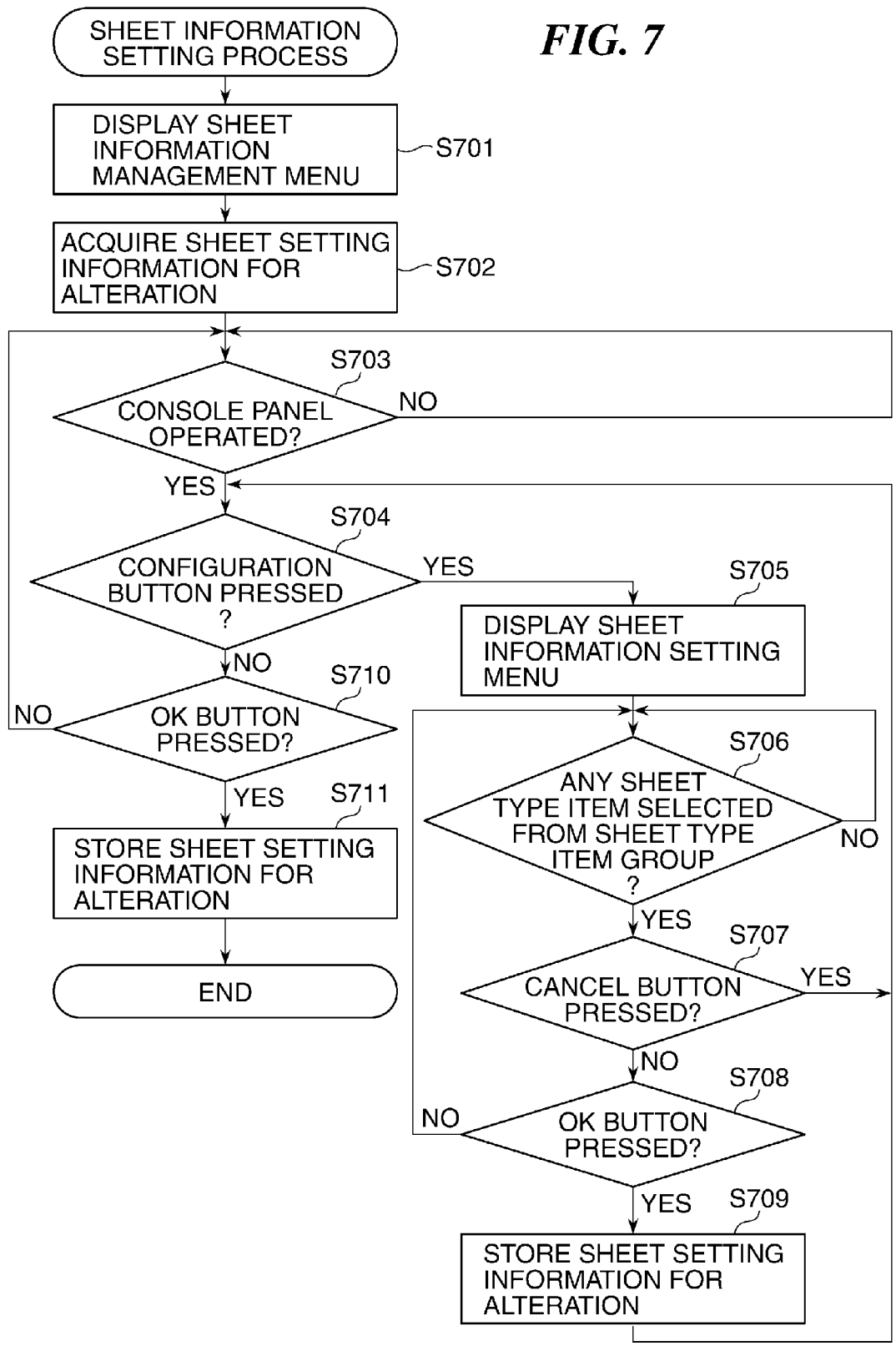
FIG. 7 is a flowchart of a sheet information setting process performed by the image forming apparatus.

FIG. 7 is a flowchart of a sheet information setting process performed by the image forming apparatus 101.

Figure 11:
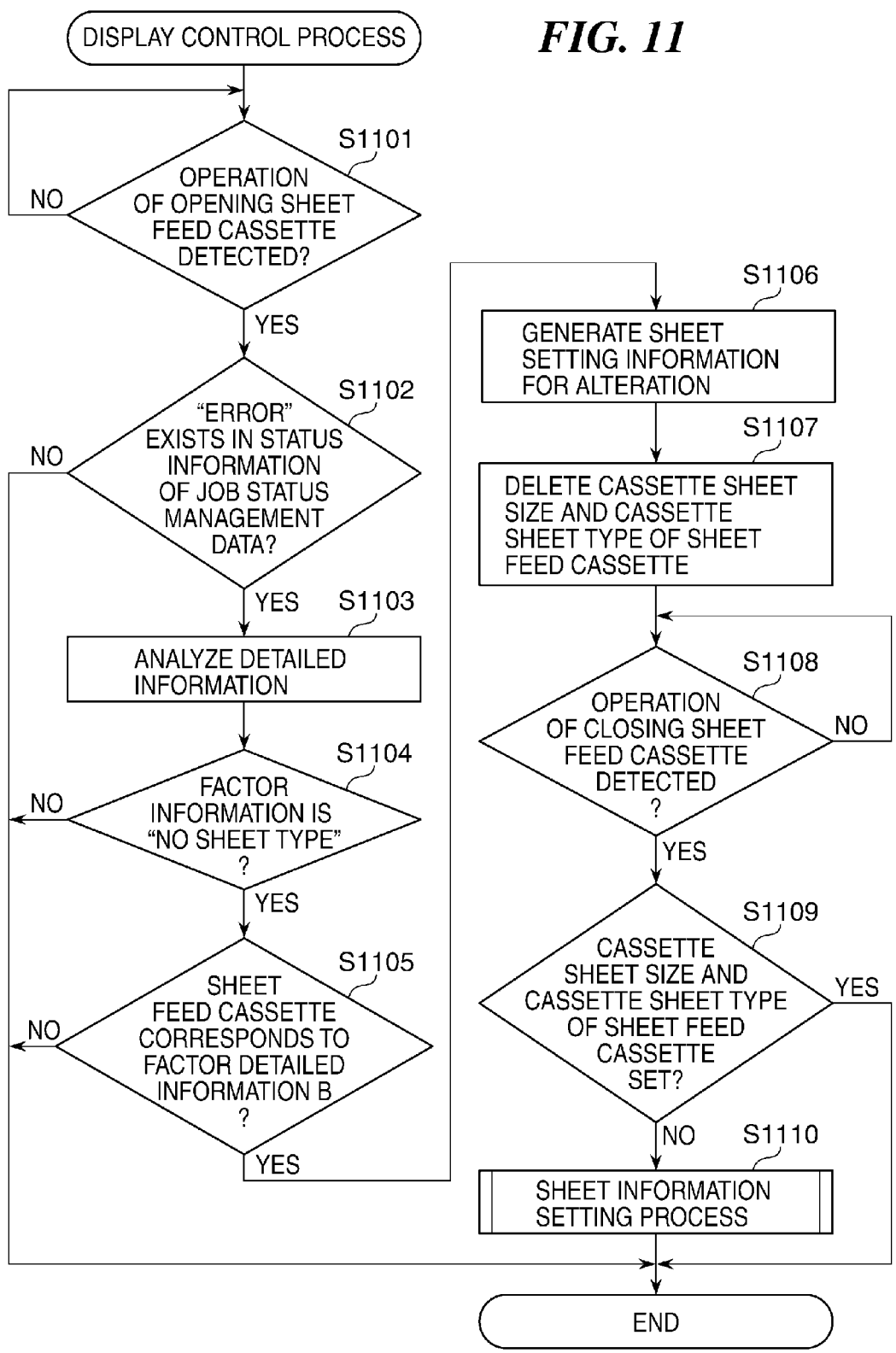
FIG. 11 is a flowchart of a display control process performed by the image forming apparatus.

The sheet information setting process in FIG. 7 is performed by the CPU 106 that executes various programs stored in the ROM 108 and the storage section 109. Note that in the sheet information setting process in FIG. 7, it is assumed that sheet setting information for alteration, which is generated based on the sheet setting information 600, for use in a display control process, described hereinafter with reference to FIG. 11, is stored in advance in the RAM 107.

Referring to FIG. 7, first, the CPU 106 transmits a control signal indicative of a display instruction to the console section 105, and causes the sheet information management menu 400 to be displayed on the console panel 301 of the console section 105 (step S701). In the present embodiment, a description will be given of a case where the sensor 206 has detected an operation of opening the sheet feed cassette 207, by way of example. In this case, the sheet information management menu 400, in which the item 405 associated with the sheet feed cassette 207 of which the operation of opening was detected has been selected as the hatched portion in FIG. 4, is displayed on the console panel 301. Then, the CPU 106 acquires the sheet setting information for alteration stored in advance in the RAM 107 (step S702). Next, upon detection of a user's operation of the console panel 301 (YES to a step S703), the CPU 106 determines whether or not the configuration button 403 of the sheet information management menu 400 has been pressed (step S704).

If it is determined in the step S704 that the configuration button 403 of the sheet information management menu 400 has been pressed, the CPU 106 causes the sheet information setting menu 500 to be displayed on the console panel 301, for setting a cassette sheet type of the sheet feed cassette 207

(step S705). Then, upon detecting that any of the sheet type items of the sheet type item group 501 has been selected (YES to a step S706), the CPU 106 determines whether or not the cancel button 503 of the sheet information setting menu 500 has been pressed (step S707).

If it is determined in the step S707 that the cancel button 503 of the sheet information setting menu 500 has been pressed, the CPU 106 cancels the selection of a sheet type item, and switches the display on the console panel 301 from the sheet information setting menu 500 to the sheet information management menu 400, and returns to the step S704.

If it is determined in the step S707 that the cancel button 503 of the sheet information setting menu 500 has not been pressed, the CPU 106 determines whether or not the OK button 502 of the sheet information setting menu 500 has been pressed (step S708).

If it is determined in the step S708 that the OK button 502 of the sheet information setting menu 500 has not been pressed, the CPU 106 returns to the step S706.

If it is determined in the step S708 that the OK button 502 of the sheet information setting menu 500 has been pressed, the CPU 106 sets or changes the cassette sheet type of the sheet feed cassette 207, included in the sheet setting information for alteration acquired in the step S702, based on the selected sheet type item, and stores in the RAM 107 the sheet setting information for alteration in which the cassette sheet type of the sheet feed cassette 207 has been set or changed, whereafter the CPU 106 further switches the display on the console panel 301 from the sheet information setting menu 500 to the sheet information management menu 400 (step S709), and returns to the step S704.

If it is determined in the step S704 that the configuration button 403 of the sheet information management menu 400 has not been pressed, the CPU 106 determines whether or not the OK button 404 of the sheet information management menu 400 has been pressed (step S710).

If it is determined in the step S710 that the OK button 404 of the sheet information management menu 400 has not been pressed, the CPU 106 returns to the step S703.

If it is determined in the step S710 that the OK button 404 of the sheet information management menu 400 has been pressed, the CPU 106 stores the sheet setting information for alteration in the RAM 107 without changing the same (step S711), followed by terminating the present process.

Next, a description will be given of a sequence of processing operations from receipt of a print job for performing the printing process by the image forming apparatus 101 to termination of the printing process.

Figure 8:
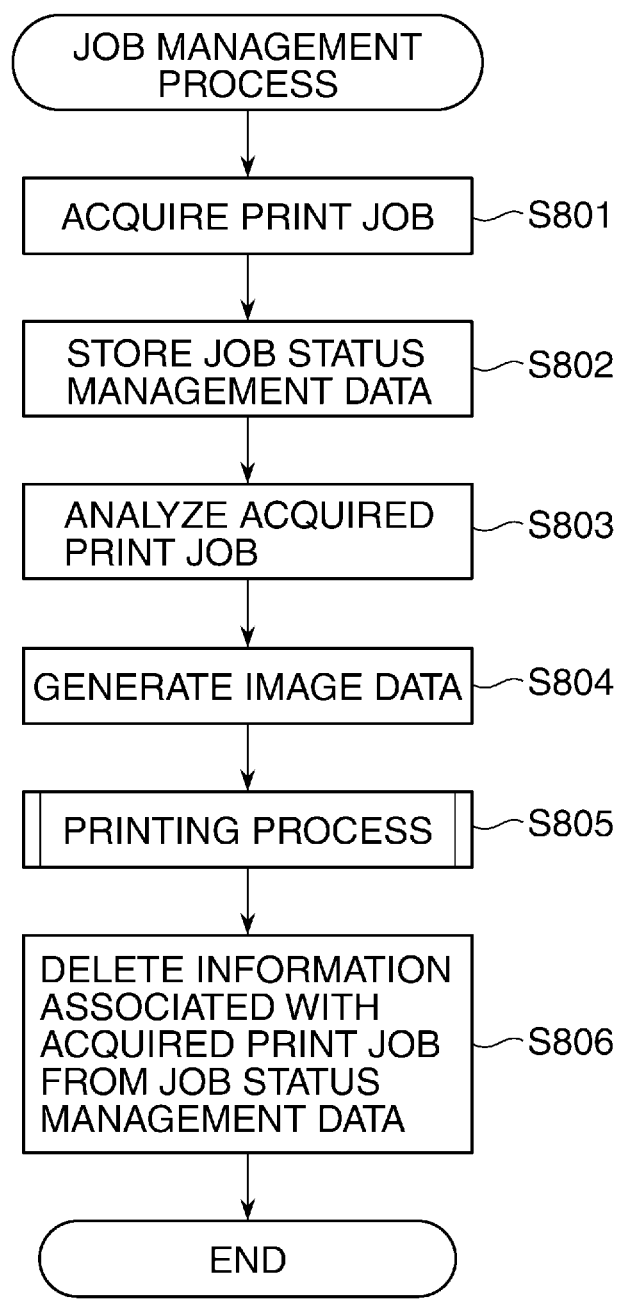
FIG. 8 is a flowchart of a job management process performed by the image forming apparatus.

FIG. 8 is a flowchart of a job management process performed by the image forming apparatus 101.

The process shown in FIG. 8 is performed by the CPU 106 which executes various programs stored in the ROM 108 and the storage section 109.

Referring to FIG. 8, first, the CPU 106 acquires the print job transmitted from the information processing apparatus (not shown) connected to the LAN 116 (step S801). The print job includes various setting information for use in the printing process, such as job-holding setting information indicating whether or not to put the print job on hold, job image information used in image generation, job sheet feeder information indicating a sheet feeder for use in the printing process, and job sheet information indicating the size and sheet type of sheets used in the printing process. Then, the CPU 106 generates job status management data 900, shown in FIG. 9A, for managing the execution status of the acquired print job, and stores the generated job status management data 900 in the RAM 107 (step S802). In the job status management data 900, there is managed the execution status of at least one print job acquired by the CPU 106. More specifically, as shown in FIG. 9A, in the job status management data 900, there are managed job name information 901 for identifying a job, user name information 902 for identifying a user who has instructed transmission of the job, status information 903 indicating an execution status of the job, and detailed information 904 indicating details of the execution status of the job, on a print job-by-print job basis. As detailed information associated with a print job, e.g. with Job 1 appearing in FIG. 9A, detailed information 906 shown in FIG. 9B is stored in the RAM 107. The detailed information 906 includes e.g. factor information 907 indicating a factor of an error, factor detailed information A 908 indicating additional information associated with the factor information 907, and factor detailed information B 909 indicating additional information associated with the factor information 907.

Then, the CPU 106 analyzes various setting information included in the print job acquired in the step S801 (hereinafter referred to as the "acquired print job") (step S803). Next, the CPU 106 generates image data based on a result of the analysis (step S804), and stores the generated image data in the RAM 107. Then, the CPU 106 performs a printing process shown in FIG. 10 using the image data stored in the RAM 107 to thereby perform printing based on the acquired print job (step S805). Then, upon termination of the printing process, the CPU 106 deletes information associated with the acquired print job from the job status management data 900 (step S806), followed by terminating the present process.

Figure 10:
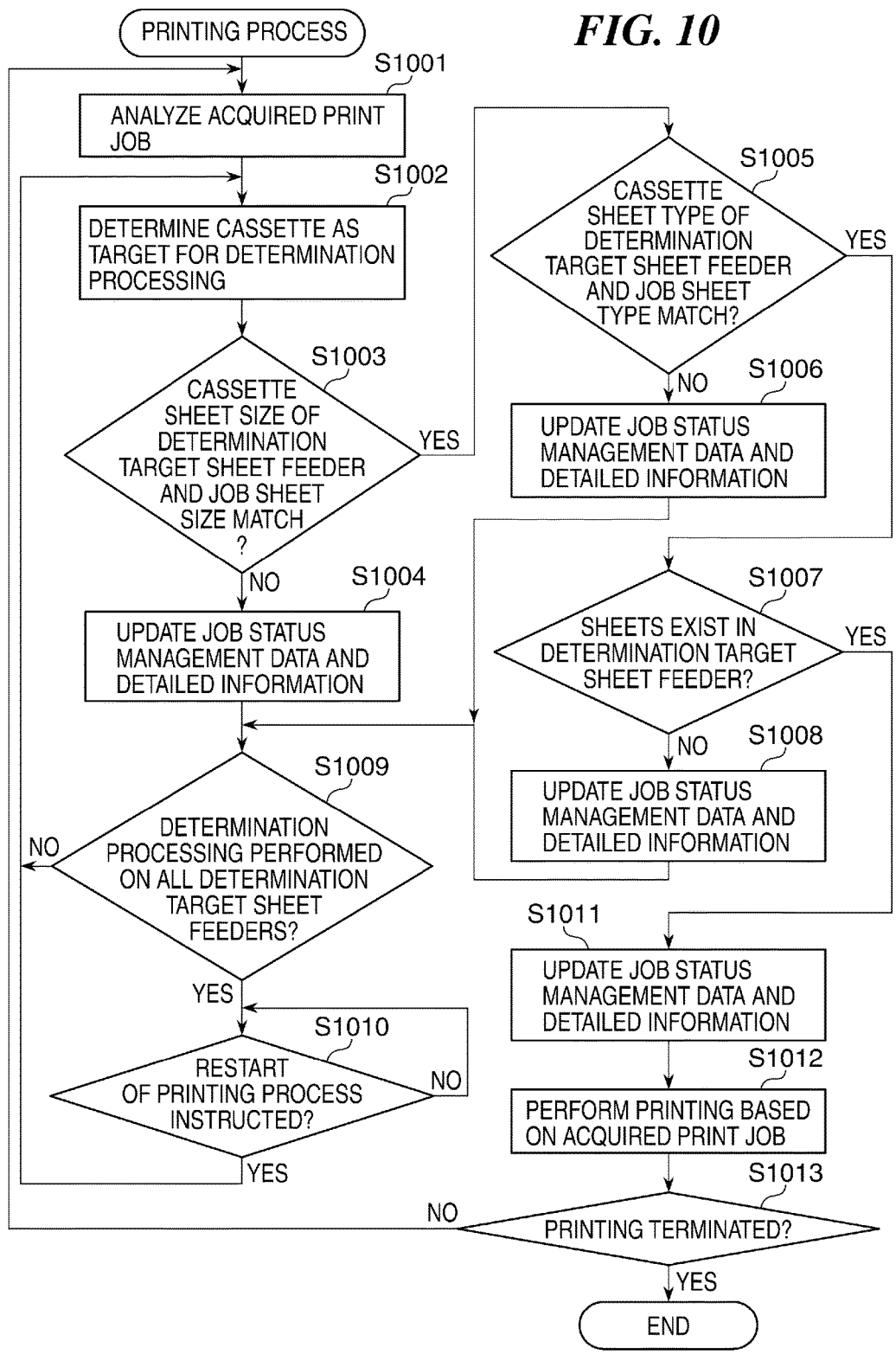
FIG. 10 is a flowchart of a printing process performed by the image forming apparatus.

FIG. 10 is a flowchart of the printing process performed by the image forming apparatus 101.

The printing process shown in FIG. 10 is performed by the CPU 106 which executes various programs stored in the ROM 108 and the storage section 109.

Referring to FIG. 10, first, the CPU 106 analyzes the job sheet feeder information and the job sheet information included in the acquired print job (step S1001). In the present embodiment, the job sheet feeder information includes e.g. information designating a specific one of the sheet feed cassettes 207 to 210, or information designating all the sheet feed cassettes 207 to 210. The job sheet information includes information indicating the size and sheet type of sheets. Then, the CPU 106 determines, based on a result of the analysis of the job sheet feeder information, one of the sheet feed cassettes 207 to 210, which is to be subjected to determination processing (hereinafter simply referred to as the "determination processing target") in steps S1003, S1005, and S1007, described hereinafter (step S1002). In the present embodiment, assuming that information designating e.g. the sheet feed cassette 207 is included in the job sheet feeder information, the CPU 106 determines the sheet feed cassette 207 as the determination processing target. On the other hand, assuming that the information designating all the sheet feed cassettes 207 to 210 is included in the job sheet feeder information, the CPU 106 determines all the sheet feed cassettes 207 to 210 as the determination processing targets. Then, in a step S1003, the CPU 106 acquires the sheet setting information 600, shown in FIG. 6, from the RAM 107, and determines whether or not there is a match between the cassette sheet size 602 of a sheet feeder in the sheet setting information 600 as a sheet feed cassette corresponding to the determination processing target determined in the step S1002 (hereinafter referred to as the "determination target sheet feeder"), and a sheet size included in the job sheet information (hereinafter referred to as the "job sheet size") (operation of a determination unit).

If it is determined in the step S1003 that there is not a match between the above-mentioned cassette sheet size 602 and the above-mentioned job sheet size, the CPU 106 determines that sheets corresponding to the job sheet size do not exist in the sheet feeder, and updates the job status management data 900 in FIG. 9A and the detailed information 906 in FIG. 9B (step S1004). More specifically, the CPU 106 records "error" in status information 903 associated with the acquired print job, in the job status management data 900 in FIG. 9A. Further, the CPU 106 records "no sheet size" indicating that there is not a match between the cassette sheet size 602 and the job sheet size, in factor information 907 in the detailed information 906 in FIG. 9B, and records the job sheet size and a sheet type included in the job sheet information (hereinafter referred to as the "job sheet type"), in the factor detailed information A 908. Further, the CPU 106 records a sheet feeder included in the job sheet feeder information in the factor detailed information B 909. Then, the CPU 106 proceeds to a step S1009.

If it is determined in the step S1003 that there is a match between the above-mentioned cassette sheet size 602 and the above-mentioned job sheet size, the CPU 106 determines in a step S1005 whether or not there is a match between the cassette sheet type 603 of the determination target sheet feeder in the sheet setting information 600 and the job sheet type (operation of the determination unit).

If it is determined in the step S1005 that there is not a match between the above-mentioned cassette sheet type 603 and the above-mentioned job sheet type, the CPU 106 determines that sheets corresponding to the job sheet type do not exist in the sheet feeder, and updates the job status management data 900 and the detailed information 906 (step S1006). More specifically, the CPU 106 records "error" in status information 903 associated with the acquired print job, in the job status management data 900. Further, the CPU 106 records "no sheet type" indicating that there is not a match between the cassette sheet type 603 and the job sheet type, in the factor information 907 of the detailed information 906 in FIG. 9B, and records the job sheet size and the job sheet type in the factor detailed information A 908. Further, the CPU 106 records a sheet feeder included in the job sheet feeder information in the factor detailed information B 909. Then, the CPU 106 proceeds to a step S1009.

If it is determined in the step S1005 that there is a match between the cassette sheet type 603 and the job sheet type, the CPU 106 determines, based on the remaining sheet amount information 604 of the determination target sheet feeder in the sheet setting information 600, whether or not sheets exist in the determination target sheet feeder (step S1007).

If it is determined in the step S1007 that sheets do not exist in the determination target sheet feeder, the CPU 106 updates the job status management data 900 and the detailed information 906 (step S1008). More specifically, the CPU 106 records "error" in status information 903 associated with the acquired print job, in the job status management data 900. Further, the CPU 106 records "sheet out" indicating that no sheets exist in the determination target sheet feeder, in the factor information 907 of the detailed information 906, and records the job sheet size and the job sheet type in the factor detailed information A 908. Further, the CPU 106 records a sheet feeder included in the job sheet feeder information in the factor detailed information B 909. Then, the CPU 106 determines whether or not the determination processing in the steps S1003, S1005, and S1007 has been performed on all the determination target sheet feeders (step S1009).

If it is determined in the step S1009 that the above-described determination processing have not been performed on all the determination target sheet feeders, the CPU 106 returns to the step S1002.

If it is determined in the step S1009 that the above-described determination processing has been performed on all the determination target sheet feeders, the CPU 106 waits until an instruction for restarting the printing process is received (step S1010). For example, after the error has been solved, and the "error" has been deleted from the status information 903 included in the job status management data 900, if the user instruction for restarting the printing process is received (YES to the step S1010), the CPU 106 restarts the printing process, and returns to the step S1002.

If it is determined in the step S1007 that sheets exist in the determination target sheet feeder, the CPU 106 determines that printing corresponding to the acquired print job can be performed, and updates the job status management data 900 and the detailed information 906 (step S1011). More specifically, the CPU 106 records "print in progress" in status information 903 associated with the print job acquired in the step S701, in the job status management data 900. Further, the CPU 106 records "normal" indicating that no error has occurred, in the factor information 907 of the detailed information 906, and records the job sheet size and the job sheet type in the factor detailed information A 908. Further, the CPU 106 records a sheet feeder included in the job sheet feeder information in the factor detailed information B 909. Next, the CPU 106 performs printing based on the acquired print job (step S1012), and determines whether or not the printing based on the print job has been terminated (step S1013).

If it is determined in the step S1013 that the above-mentioned printing has not been terminated, the CPU 106 returns to the step S1001.

If it is determined in the step S1013 that the above-mentioned printing has been terminated, the CPU 106 terminates the present process.

FIG. 11 is a flowchart of the display control process performed by the image forming apparatus 101.

The display control process shown in FIG. 11 is performed by the CPU 106 which executes various programs stored in the ROM 108 and the storage section 109.

Referring to FIG. 11, first, when the CPU 106 receives from the sensor 206 a notification indicating that the sensor 206 has detected an operation of opening any of the sheet feed cassettes 207 to 210, e.g. the sheet feed cassette 207 (YES to a step S1101), the CPU 106 determines whether or not "error" exists in the status information 903 of the job status management data 900 stored in the RAM 107 (step S1102).

If it is determined in the step S1102 that "error" exists in the status information 903, the CPU 106 analyzes the detailed information 906 of a print job of which the status information 903 is "error", e.g. Job 1 (step S1103). Then, the CPU 106 determines, based on a result of the analysis, whether or not the factor information 907 of the detailed information 906 is "no sheet type" (step S1104).

Incidentally, although in the present embodiment, the error which has occurred in the printing process in FIG. 10 is assumed to be "no sheet type", by way of example, in a case where the error which has occurred in the printing process is an error corresponding to "no sheet size", that is, in a case where there is not a match between the cassette sheet size 602 and the job sheet size, if, in order to solve the error, sheets of a sheet size different from the cassette sheet size 602 (e.g. sheets corresponding to the job sheet size) are replenished to the sheet feeder of which the error has been detected, the cassette sheet size 602 is automatically newly set based on a result of detection by the sensor 206, so that there is no need to perform an operation on the sheet information management menu 400.

Further, in a case where the error which has occurred in the printing process is "sheet out", it is expected that in order to solve the error, sheets of the same specifications as the cassette sheet size 602 and the cassette sheet type 603 are replenished. In this case as well, there is no need to perform an operation on the sheet information management menu 400.

On the other hand, in a case where the error which has occurred in the printing process is "no sheet type", i.e. in a case where there is not a match between the cassette sheet type 603 and the job sheet type, if, in order to solve the error, sheets of a sheet type different from the cassette sheet type 603 (e.g. sheets corresponding to the job sheet type) are replenished to the sheet feeder of which the error has been detected, it is required to set the cassette sheet type 603 of the sheet setting information 600 by performing an operation on the sheet information setting menu 500 shown in FIG. 5. To cope with this, in the present embodiment, an error is identified which has occurred in the printing process in FIGS. 9A and 9B, and it is determined whether an operation is expected to be performed on the sheet information setting menu 500 in order to solve the error.

To this end, if it is determined in the step S1104 that the factor information 907 of the detailed information 906 is "no sheet type", the CPU 106 determines whether or not the sheet feed cassette 207 of which an operation of opening has been detected in the step S1101 corresponds to, e.g. matches, the factor detailed information B 909 of the detailed information 906 (step S1105).

If it is determined in the step S1105 that the sheet feed cassette 207 of which an operation of opening has been detected corresponds to the factor detailed information B 909 of the detailed information 906, the CPU 106 determines that to solve the error, an operation is expected to be performed on the sheet information setting menu 500, and in preparation for alteration of the sheet setting information 600, generates, using the sheet setting information 600, sheet setting information for alteration which has the same information as the sheet setting information 600 (step S1106). Note that in the present embodiment, the sheet setting information 600 which has existed from before generation of the sheet setting information for alteration continues to be held. Then, the CPU 106 deletes the cassette sheet size 602 and cassette sheet type 603 of the sheet feed cassette 207 from the generated sheet setting information for alteration (step S1107). Next, when an operation of closing the sheet feed cassette 207 is detected by the sensor 206 (YES to a step S1108), the CPU 106 determines whether or not the cassette sheet size 602 and cassette sheet type 603 of the sheet feed cassette 207 are set in the sheet setting information for alteration (step S1109).

If it is determined in the step S1109 that the cassette sheet size 602 and cassette sheet type 603 of the sheet feed cassette 207 are not set in the sheet setting information for alteration, the CPU 106 performs the sheet information setting process in FIG. 7, and causes the sheet information management menu 400 to be displayed on the console panel 301 (step S1110), thereby causing the user to set the cassette sheet size 602 and the cassette sheet type 603, followed by terminating the present process.

If it is determined in the step S1102 that "error" does not exist in the status information 903, if it is determined in the step S1104 that the factor information 907 of the detailed information 906 is not "no sheet type", if it is determined in the step S1105 that the sheet feed cassette 207 of which an operation of opening has been detected does not correspond to the factor detailed information B 909 of the detailed information 906, or if it is determined in the step S1109 that the cassette sheet size 602 and cassette sheet type 603 of the sheet feed cassette 207 are set in the sheet setting information for alteration, the CPU 106 determines that there is no need to perform an operation on the sheet information setting menu 500, and terminates the present process without displaying the sheet information management menu 400 used for displaying the sheet information setting menu 500.

According to the display control process in FIG. 11, even when an operation of opening of the sheet feed cassette 207 has been detected, if the cassette sheet type 603 of the sheet feed cassette 207, set in the sheet setting information 600, corresponds to the job sheet type, the setting screen is not displayed. Here, the case where the cassette sheet type 603 of the sheet feed cassette 207, set in the sheet setting information 600, corresponds to the job sheet type is nothing other than a case where the print job is being performed. However, assuming that the operation of opening of the sheet feed cassette 207 is performed during execution of the print job, it is difficult to expect that sheets having different specifications are replenished to the sheet feed cassette 207. Therefore, when the cassette sheet type 603 of the sheet feed cassette 207, set in the sheet setting information 600, corresponds to the job sheet type included in the print job, even if sheets are replenished to the sheet feed cassette 207, it is unnecessary to alter the sheet setting information 600 including the cassette sheet type 603 of the sheet feed cassette 207, and also it is unnecessary to display the sheet information setting menu 500 for setting the cassette sheet type 603 of the sheet feed cassette 207 and the sheet information management menu 400 used for displaying the sheet information setting menu 500. Accordingly, when the cassette sheet type 603 of the sheet feed cassette 207 of which an operation of opening has been detected corresponds to the job sheet type, the sheet information management menu 400 is not displayed, whereby it is possible to eliminate the need of performing an unnecessary operation on the sheet information management menu 400, and save the user time and effort in replenishing sheets.

While the present invention has been described with reference to the embodiment, it is to be understood that the invention is not limited to the embodiment.

For example, in the display control process described with reference to FIG. 11, the step S1101 may be executed based on a detection result that one of the sheet feed cassettes 207 to 210 has been removed from the sheet feeding section 202.

Further, in the sheet information setting process described with reference to FIG. 7, in the step S711, not the sheet setting information for alteration but the held sheet setting information 600 may be stored in the RAM 107. With this, e.g. when the sheet setting information 600 is not altered although the sheet information management menu 400 is displayed, it is possible to reuse the sheet setting information 600 which has been set before the sheet information management menu 400 is displayed.

Further, although in the above-described embodiment, display of the sheet information management menu 400 is determined based on details of an error, the display of the sheet information management menu 400 may be determined based on sheet information of a print job intentionally put on hold according to the settings of the print job.

The following description will be given of a variation of the image forming apparatus according to the present embodiment, which determines the display of the sheet information management menu 400 based on sheet information of a print job put on hold, with reference to FIGS. 12 to 16.

Figure 12:
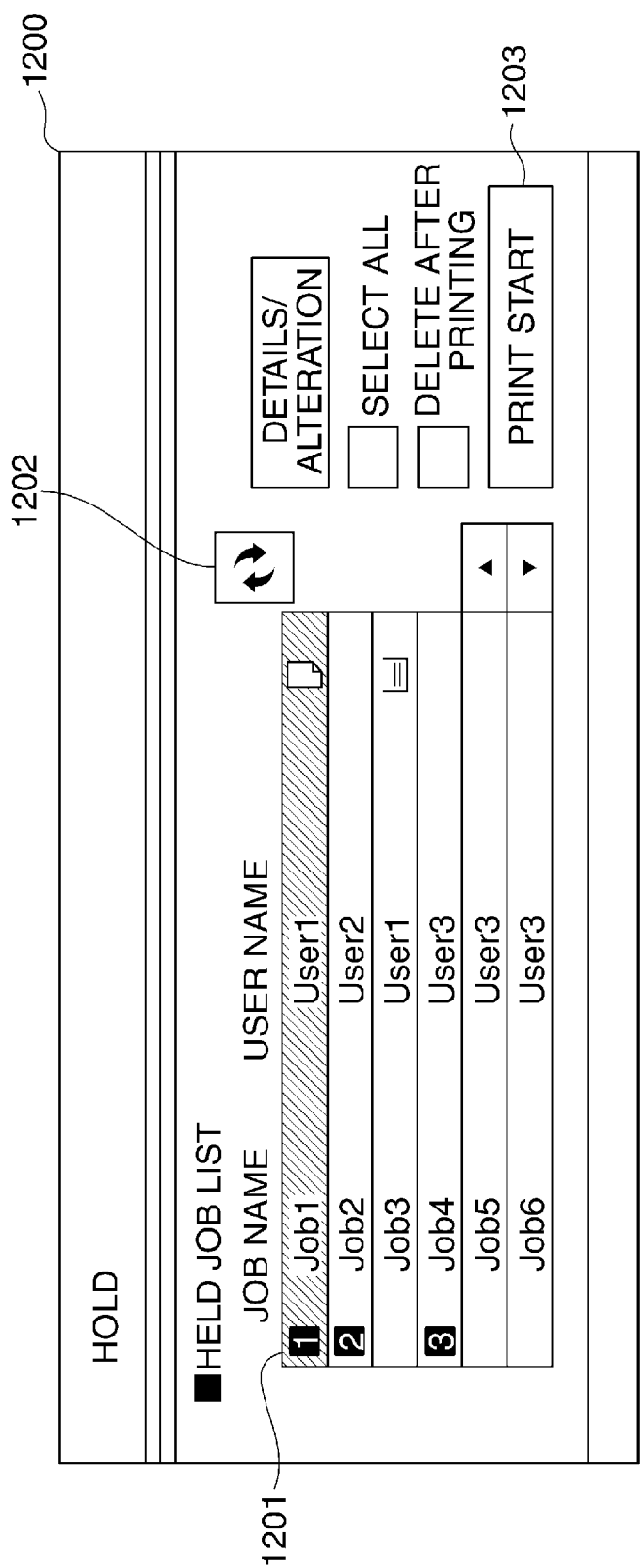
FIG. 12 is a view useful in explaining a held job management menu displayed on a display panel of a variation of the image forming apparatus according to the present embodiment.

Here, in the present variation, whether to execute the print job or put the same on hold is determined based on job-holding setting information included in the print job. A print job which is put on hold (hereinafter referred to as the "held print job") is held in queue until an instruction for starting the execution of the held print job is given. For example, when an instruction for starting the execution of the held print job is input by a user's operation on the console section 105, the held print job is put into execution according to the instruction. Various information of the held print job can be viewed in a held job management menu 1200 which is shown in FIG. 12, and is displayed on the console panel 301. When the print job is put on hold based on job-holding setting information included in the print job, the print job (held print job) is displayed in the held job management menu 1200 by adding information corresponding to the held print job thereto. The held job management menu 1200 includes a held print job information group 1201 indicating held print job information for identifying held print jobs on a held print job-by-held print job basis, an update button 1202 for updating various information of the held print jobs, and a print start button 1203 for starting execution of each held print job. For example, in a case where one of held print job information items of the held print job information group 1201 is selected, when the print start button 1203 is pressed, a held print job corresponding to the selected held print job information item is put into execution. Further, when the update button 1202 is pressed, various information of the held print job corresponding to the selected held print job information, e.g. status information, described hereinafter, of the held print job is updated. Various information displayed in the held job management menu 1200 is managed in the form of held job management data 1300 shown in FIG. 13A. In the present variation, when a print job is put on hold, the management data based on which the print job is managed is shifted from the job status management data 900 to the held job management data 1300. The held job management data 1300 includes held job name information 1301 for identifying a held print job, user name information 1302 for identifying a user who has instructed transmission of the held print job, status information 1303 indicating a status of the held print job, and detailed status information 1304 indicating details of the status information.

In the present variation, the held job management data 1300, and detailed status information 1306, shown in FIG. 13B, associated with each held print job of the held job management data 1300 are stored in the RAM 107. The detailed status information 1306 includes e.g. to-be-used sheet information 1307 indicating sheet information set in the held print job, sheet feeder information 1308 indicating a sheet feeder set in the held print job, and job status information 1309 indicating a status of a held print job associated with the sheet feeder.

Figure 14:
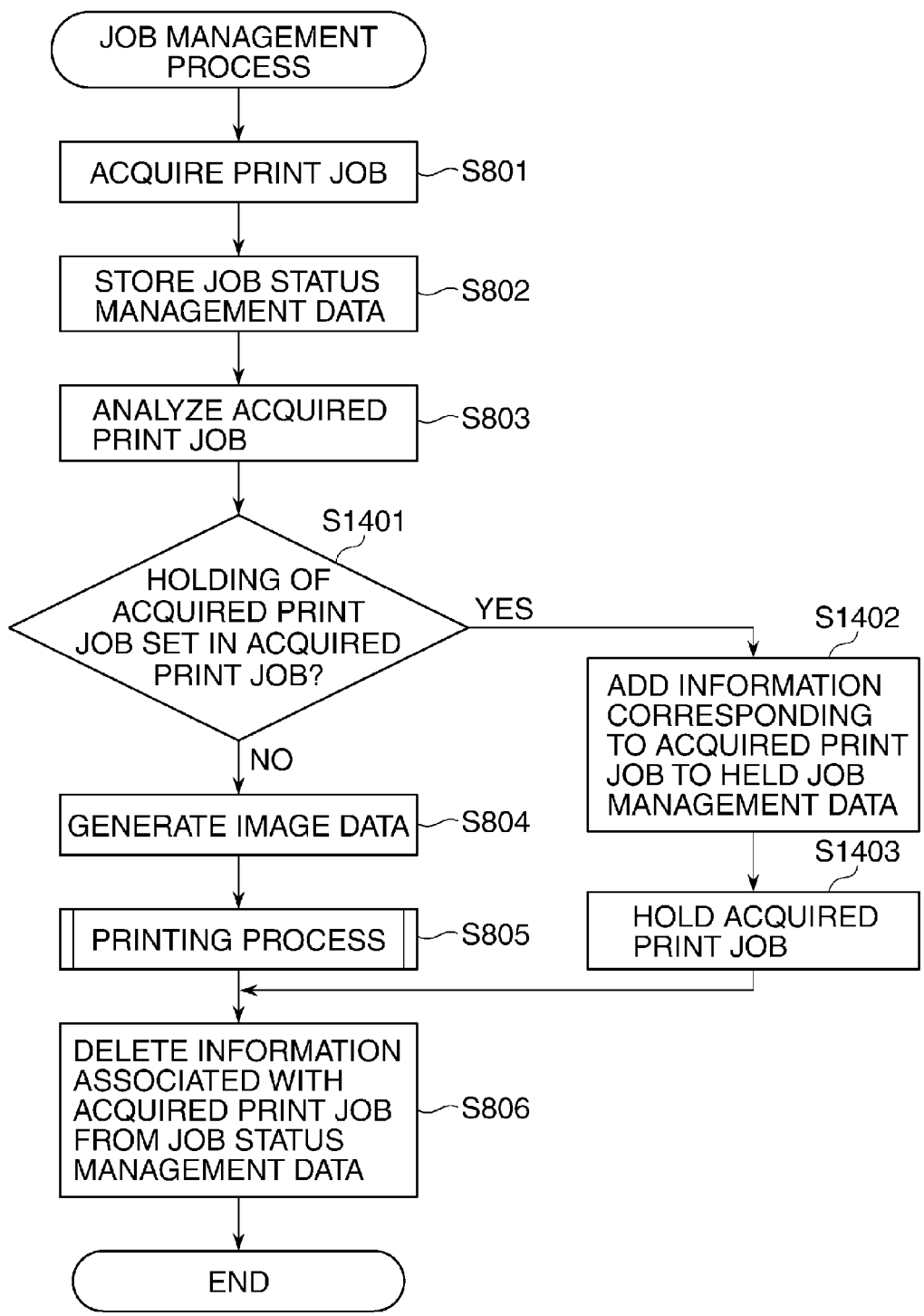
FIG. 14 is a flowchart of a job management process performed by the variation of the image forming apparatus.

FIG. 14 is a flowchart of a job management process performed by the variation of the image forming apparatus.

The job management process shown in FIG. 14 is performed by the CPU 106 which executes various programs stored in the ROM 108 and the storage section 109.

In the job management process shown in FIG. 14, first, the CPU 106 performs the same processing as in the steps S801 to S803 in FIG. 8. Then, the CPU 106 determines, based on a result of the analysis in the step S803, whether or not holding of the acquired print job is set in job-holding setting information included in the acquired print job (step S1401).

If it is determined in the step S1401 that holding of the acquired print job is set in the job-holding setting information, the CPU 106 adds information corresponding to the acquired print job to the held job management data 1300 shown in FIG. 13A (step S1402), and stores the held job management data 1300 having the information added thereto in the RAM 107. Then, the CPU 106 puts the acquired print job on hold (step S1403), and performs the same processing as in the step S806 in FIG. 8, followed by terminating the present process.

If it is determined in the step S1401 that holding of the acquired print job is not set in the job-holding setting information, the CPU 106 performs the same processing as in the steps S804 to S806 in FIG. 8, and terminates the present process.

Figure 15A:
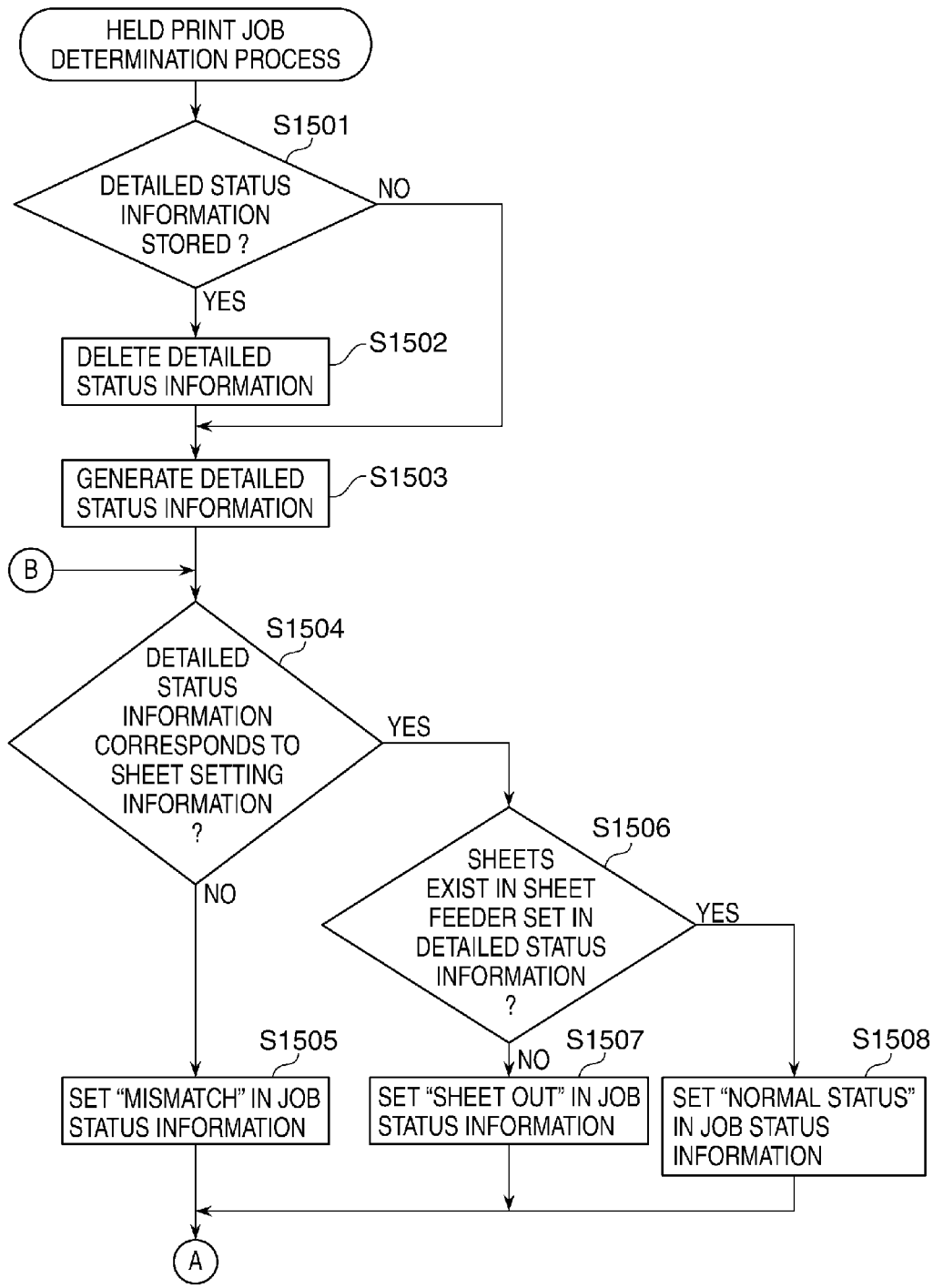
FIG. 15A is a flowchart of a held print job determination process performed by the variation of the image forming apparatus.
Figure 15B:
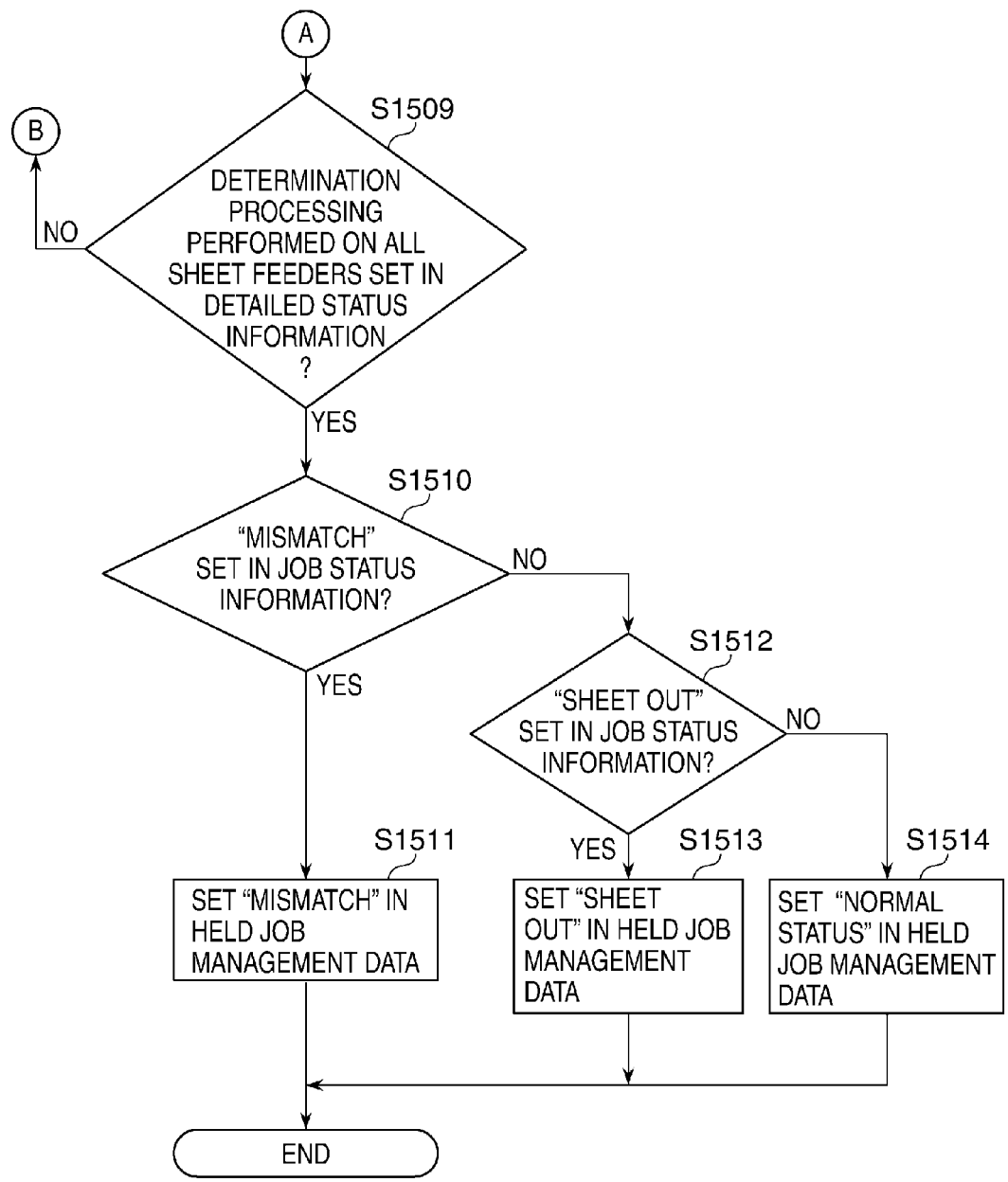
FIG. 15B is a continuation of FIG. 15A.

FIGS. 15A and 15B are a flowchart of a held print job determination process performed by the variation of the image forming apparatus.

The held print job determination process shown in FIGS. 15A and 15B is performed by the CPU 106 which executes various programs stored in the ROM 108 and the storage section 109.

In the held print job determination process shown in FIGS. 15A and 15B, first, when update of the held print job is instructed, for example, when one of the held print job information items is selected from the held print job information group 1201 in the held job management menu 1200 displayed on the console section 105, and the update button 1202 is pressed, the CPU 106 identifies a held print job corresponding to the selected held print job information item. Then, the CPU 106 determines whether or not detailed status information 1306 associated with the held print job which is identified (hereinafter referred to as "the identified held print job") is stored in the RAM 107 (step S1501).

If it is determined in the step S1501 that the detailed status information 1306 associated with the identified held print job is not stored in the RAM 107, the CPU 106 proceeds to a step S1503 without executing a step S1502.

If it is determined in the step S1501 that the detailed status information 1306 associated with the identified held print job is stored in the RAM 107, the CPU 106 deletes the detailed status information 1306 from the RAM 107 (step S1502). Then, the CPU 106 newly generates detailed status information 1306 associated with the identified held print job based on various setting information included in the identified held print job (step S1503). In the step S1503, the to-be-used sheet information 1307 and the sheet feeder information 1308 of the detailed status information 1306 are set based on job sheet feeder information and job sheet information of the identified held print job, respectively. Then, the CPU 106 determines whether or not the detailed status information 1306 corresponds to the sheet setting information 600 (step S1504). In the present variation, for example, in a case where the "sheet feed cassette 207" is set in the sheet feeder information 1308 of the detailed status information 1306, and "A5 plain paper 1" is set in the to-be-used sheet information 1307 of the detailed status information 1306, if the cassette sheet size 602 and the cassette sheet type 603 of the sheet feed cassette 207 in the sheet setting information 600 are "A5" and "plain paper 1", respectively, the CPU 106 determines that the detailed status information 1306 corresponds to the sheet setting information 600. On the other hand, if the cassette sheet size 602 and the cassette sheet type 603 of the sheet feed cassette 207 in the sheet setting information 600 are not "A5" and "plain paper 1", respectively, the CPU 106 determines that the detailed status information 1306 does not correspond to the sheet setting information 600.

If it is determined in the step S1504 that the detailed status information 1306 does not correspond to the sheet setting information 600, the CPU 106 sets "mismatch" indicating that the detailed status information 1306 does not correspond to the sheet setting information 600, in the job status information 1309 of the detailed status information 1306 (step S1505). Then, the CPU 106 proceeds to a step S1509.

If it is determined in the step S1504 that the detailed status information 1306 corresponds to the sheet setting information 600, the CPU 106 determines whether or not sheets exist in a sheet feeder set in the sheet feeder information 1308 of the detailed status information 1306 (step S1506).

If it is determined in the step S1506 that no sheets exist in the sheet feeder set in the sheet feeder information 1308 of the detailed status information 1306, the CPU 106 sets "sheet out" indicating that no sheets exist in the sheet feeder set in the sheet feeder information 1308 of the detailed status information 1306, in the job status information 1309 of the detailed status information 1306 (step S1507). Then, the CPU 106 proceeds to the step S1509.

If it is determined in the step S1506 that sheets exist in the sheet feeder set in the sheet feeder information 1308 of the detailed status information 1306, the CPU 106 set "normal status" indicating that the identified held print job can be executed, in the job status information 1309 of the detailed status information 1306 (step S1508). Then, the CPU 106 determines whether or not the determination processing in the steps S1504 and S1506 has been performed on all the sheet feeders set in the sheet feeder information 1308 of the detailed status information 1306 (step S1509).

If it is determined in the step S1509 that the determination processing in the steps S1504 and S1506 has not been performed on all the sheet feeders set in the sheet feeder information 1308 of the detailed status information 1306, the CPU 106 returns to the step S1504.

If it is determined in the step S1509 that the determination processing in the steps S1504 and S1506 has been performed on all the sheet feeders set in the sheet feeder information 1308 of the detailed status information 1306, the CPU 106 determines whether or not "mismatch" is set in the job status information 1309 of the detailed status information 1306 (step S1510).

If it is determined in the step S1510 that "mismatch" is set in the job status information 1309 of the detailed status information 1306, the CPU 106 sets "mismatch" in status information associated with the identified held print job, in the held job management data 1300 (step S1511), and terminates the present process.

If it is determined in the step S1510 that "mismatch" is not set in the job status information 1309 of the detailed status information 1306, the CPU 106 determines whether or not "sheet out" is set in the job status information 1309 of the detailed status information 1306 (step S1512).

If it is determined in the step S1512 that "sheet out" is set in the job status information 1309 of the detailed status information 1306, the CPU 106 sets "sheet out" in status information associated with the identified held print job, in the held job management data 1300 (step S1513), and terminates the present process.

If it is determined in the step S1512 that "sheet out" is not set in the job status information 1309 of the detailed status information 1306, the CPU 106 sets "normal status" in status information associated with the identified held print job, in the held job management data 1300 (step S1514), and terminates the present process.

Figure 16:
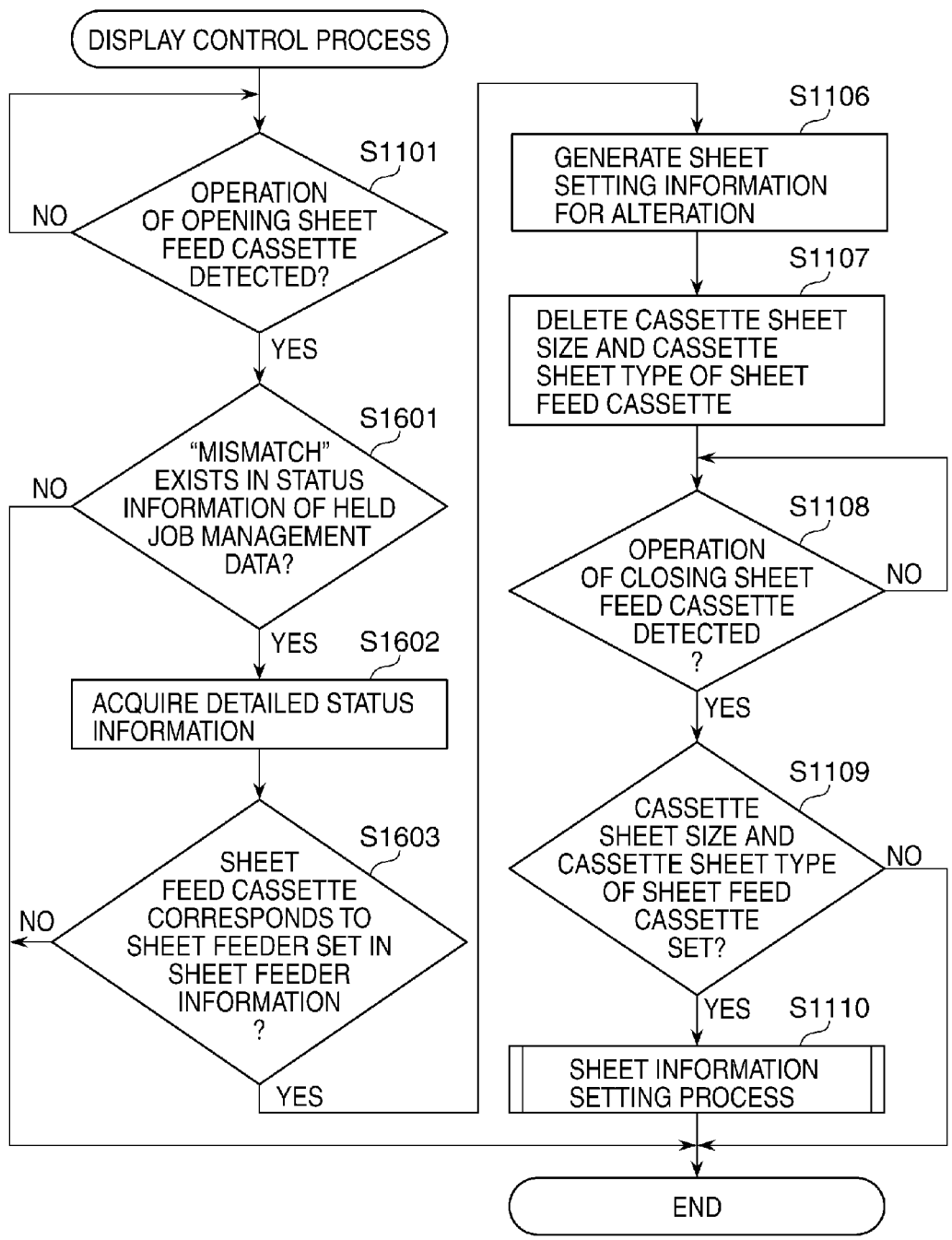
FIG. 16 is a flowchart of a display control process performed by the variation of the image forming apparatus.

FIG. 16 is a flowchart of a display control process performed by the variation of the image forming apparatus.

The display control process shown in FIG. 16 is executed by the CPU 106 which executes various programs stored in the ROM 108 and the storage section 109.

Referring to FIG. 16, first, the CPU 106 performs the same processing as in the step S1101 in FIG. 11. Next, the CPU 106 determines whether or not "mismatch" exists in the status information 1303 of the held job management data 1300 (step S1601). Here, in the present variation, the case where "sheet out" is set in the status information 1303 in the held job management data 1300 is nothing other than a case where sheets of the same specifications as the cassette sheet size 602 and the cassette sheet type 603 included in the sheet setting information 600 are replenished. In this case, there is no need to perform an operation on the sheet information management menu 400. Further, in a case where "normal status" is set in the status information 1303 in the held job management data 1300, sheets of a sheet size and a sheet type associated with the held print job are stored in a designated sheet feeder, and hence there is no need to replenish sheets nor to perform an operation on the sheet information management menu 400.

On the other hand, in a case where "mismatch" is set in the status information 1303 in the held job management data 1300, to solve the "mismatch" before execution of the held print job, for example, when sheets are replenished which are of a sheet type different from the cassette sheet type 603 in the sheet setting information 600 of the sheet feed cassette 207 as the detected sheet feeder, it is required to reset the cassette sheet type 603 in the sheet setting information 600 by performing an operation on the sheet information setting menu 500 in FIG. 5.

That is, in the present variation, an error is identified for which an operation is expected to be performed on the sheet information setting menu 500 in order to solve "mismatch" set in the held print job determination process in FIGS. 15A and 15B before execution of the held print job.

To this end, if it is determined in the step S1601 that "mismatch" exists in the status information 1303 of the held job management data 1300, the CPU 106 identifies a held print job having "mismatch" set in the status information 1303, and acquires detailed status information 1306 associated with the held print job (step S1602). Then, the CPU 106 determines whether or not the sheet feed cassette 207 of which an operation of opening has been detected in the step S1101 corresponds to, e.g. matches, the sheet feeder set in the sheet feeder information 1308 of the detailed status information 1306 (step S1603).

If it is determined in the step S1603 that the sheet feed cassette 207 of which an operation of opening has been detected corresponds to the sheet feeder set in the sheet feeder information 1308 of the detailed status information 1306, the CPU 106 determines that an operation is expected to be performed on the sheet information setting menu 500, and executes the steps S1106 to S1110 in FIG. 11, followed by terminating the present process.

If it is determined in the step S1601 that "mismatch" does not exist in the status information 1303 of the held job management data 1300, or if it is determined in the step S1603 that the sheet feed cassette 207 of which an operation of opening has been detected does not correspond to the sheet feeder set in the sheet feeder information 1308 of the detailed status information 1306, the CPU 106 determines that there is no need to perform an operation on the sheet information setting menu 500, and terminates the present process without displaying the sheet information management menu 400 used for displaying the sheet information setting menu 500.

By performing the above-described display control process in FIG. 16, it is possible to obtain the same advantageous effects as provided by the display control process in FIG. 11.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-023052 filed Feb. 9, 2015 which is hereby incorporated by reference herein in its entirety.

What is claimed is:

1. An image forming apparatus comprising:
a plurality of sheet feed cassettes configured to store sheets;
an image forming unit configured to form an image on a sheet;
a sensor configured to detect an opening or closing of each sheet feed cassette;
a display unit;
a processor; and
a memory in communication with the processor, the memory storing instructions, which, when executed by the processor, cause the image forming apparatus to:
receive a print job in which a sheet size and a sheet type are designated;
select, from among the plurality of sheet feed cassettes, a sheet feed cassette corresponding to the sheet size designated in the print job;
in a case where a sheet type of the selected sheet feed cassette matches with the sheet type designated in the print job, control the image forming unit to form an image on a sheet fed from the selected sheet feed cassette, wherein, in a case where the sheet type of the selected sheet feed cassette does not match with the sheet type designated in the print job, an execution of the print job is suspended;
in a case where an opening or closing of one of the plurality of sheet feed cassettes is detected while the execution of the print job is suspended, determine whether the sheet feed cassette of which the opening or closing is detected matches with the selected sheet feed cassette;
in a case where it is determined that the sheet feed cassette of which the opening or closing is detected matches with the selected sheet feed cassette, cause the display unit to display a setting screen for setting a sheet type for the sheet feed cassette of which the opening or closing is detected; and
in a case where the sheet type set through the setting screen matches with the sheet type designated in the print job, control the image forming unit to form an image on a sheet fed from the sheet feed cassette of which the sheet type is set.

2. The image forming apparatus according to claim 1, wherein the print job is held in queue.

3. The image forming apparatus according to claim 1, wherein in a case where an opening or closing is detected while a sheet out occurs on the selected sheet feed cassette, the processor does not cause the display unit to display the setting screen.

4. The image forming apparatus according to claim 1, wherein in a case where the sheet type of the selected sheet feed cassette does not match with the sheet type designated in the print job, the processor stores error information indicating that there is a mismatch between the sheet types into a memory.

5. A method of controlling an image forming apparatus comprising a plurality of sheet feed cassettes configured to store sheets, an image forming unit configured to form an image on a sheet, a sensor configured to detect an opening or closing of each sheet feed cassette, and a display unit, the method comprising:
receiving a print job in which a sheet size and a sheet type are designated;
selecting, from among the plurality of sheet feed cassettes, a sheet feed cassette corresponding to the sheet size designated in the print job;
in a case where a sheet type of the selected sheet feed cassette matches with the sheet type designated in the print job, controlling the image forming unit to form an image on a sheet fed from the selected sheet feed cassette, wherein, in a case where the sheet type of the selected sheet feed cassette does not match with the sheet type designated in the print job, an execution of the print job is suspended;
in a case where an opening or closing of one of the plurality of sheet feed cassettes is detected while the execution of the print job is suspended, determining whether the sheet feed cassette of which the opening or closing is detected matches with the selected sheet feed cassette;

in a case where it is determined that the sheet feed cassette of which the opening or closing is detected matches with the selected sheet feed cassette, causing the display unit to display a setting screen for setting a sheet type for the sheet feed cassette of which the opening or closing is detected; and in a case where the sheet type set through the setting screen matches with the sheet type designated in the print job, controlling the image forming unit to form an image on a sheet fed from the sheet feed cassette of which the sheet type is set.

6. A non-transitory computer-readable storage medium storing a computer-executable program for executing a method of controlling an image forming apparatus comprising a plurality of sheet feed cassettes configured to store sheets, an image forming unit configured to form an image on a sheet, a sensor configured to detect an opening or closing of each sheet feed cassette, and a display unit, the method comprising:

receiving a print job in which a sheet size and a sheet type are designated;

selecting, from among the plurality of sheet feed cassettes, a sheet feed cassette corresponding to the sheet size designated in the print job;

in a case where a sheet type of the selected sheet feed cassette matches with the sheet type designated in the print job, controlling the image forming unit to form an image on a sheet fed from the selected sheet feed cassette, wherein, in a case where the sheet type of the selected sheet feed cassette does not match with the sheet type designated in the print job, an execution of the print job is suspended;

in a case where an opening or closing of one of the plurality of sheet feed cassettes is detected while the execution of the print job is suspended, determining whether the sheet feed cassette of which the opening or closing is detected matches with the selected sheet feed cassette;

in a case where it is determined that the sheet feed cassette of which the opening or closing is detected matches with the selected sheet feed cassette, causing the display unit to display a setting screen for setting a sheet type for the sheet feed cassette of which the opening or closing is detected; and in a case where the sheet type set through the setting screen matches with the sheet type designated in the print job, controlling the image forming unit to form an image on a sheet fed from the sheet feed cassette of which the sheet type is set.

* * * * *